(12) United States Patent
Gharan et al.

(10) Patent No.: US 12,476,711 B2
(45) Date of Patent: Nov. 18, 2025

(54) IN-PHASE (I) / QUADRATURE (Q) CORRELATION DITHER FOR MODULATOR QUADRATURE CONTROL

(71) Applicant: CIENA CORPORATION, Hanover, MD (US)

(72) Inventors: Shahab Oveis Gharan, Ottawa (CA); Yves Beaulieu, Nepean (CA); Douglas McGhan, Ottawa (CA); Kim Byron Roberts, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 242 days.

(21) Appl. No.: 18/328,027

(22) Filed: Jun. 2, 2023

(65) Prior Publication Data

US 2024/0405880 A1     Dec. 5, 2024

(51) Int. Cl.
*H04B 10/516* (2013.01)

(52) U.S. Cl.
CPC .................. *H04B 10/516* (2013.01)

(58) Field of Classification Search
CPC ..................................... H04B 10/516
USPC ........................................... 398/185
See application file for complete search history.

(56) References Cited

U.S. PATENT DOCUMENTS

| | | | |
|---|---|---|---|
| 7,266,306 B1 | 9/2007 | Harley et al. | |
| 7,676,161 B2 | 3/2010 | Roberts et al. | |
| 8,131,148 B2 | 3/2012 | Sun et al. | |
| 8,249,467 B2 | 8/2012 | Roberts et al. | |
| 9,059,805 B2 | 6/2015 | Mak et al. | |
| 9,294,200 B2 | 3/2016 | Mak et al. | |
| 10,263,708 B2 | 4/2019 | Bianciotto et al. | |
| 10,560,195 B2 * | 2/2020 | Fan | H04B 10/50575 |
| 10,608,746 B2 | 3/2020 | Zhuge et al. | |
| 10,742,324 B1 * | 8/2020 | Padmaraju | H04B 10/541 |
| 2010/0067902 A1 * | 3/2010 | Sun | H04B 10/0799 398/25 |

(Continued)

FOREIGN PATENT DOCUMENTS

WO     WO-2015124115 A2 *   8/2015   ......... H04B 10/5561

OTHER PUBLICATIONS

Li et al; Modulation-format-free and automatic bias control for optical IQ modulators based on dither-correlation detection, 2017, Optics Express vol. 25, No. 8, pp. 1-13. (Year: 2017).*

(Continued)

*Primary Examiner* — Amritbir K Sandhu
(74) *Attorney, Agent, or Firm* — Guntin & Gust, PLC; Andrew Gust

(57) ABSTRACT

Aspects of the subject disclosure may include, for example, obtaining two inputs $x_I$ and $x_Q$ based on a digital input signal, and causing a modulator to create two substantially orthogonal output dimensions I and Q based on the two inputs $x_I$ and $x_Q$, by performing controlled introduction of a correlation between the two inputs $x_I$ and $x_Q$ for the modulator, and detecting a resulting output power of the modulator to facilitate operation of the modulator. Other embodiments are disclosed.

21 Claims, 6 Drawing Sheets

(56) References Cited

U.S. PATENT DOCUMENTS

| | | | |
|---|---|---|---|
| 2018/0267340 A1* | 9/2018 | Rohde | G02F 1/225 |
| 2019/0199442 A1* | 6/2019 | Bianciotto | H04B 10/5055 |
| 2021/0405880 A1* | 12/2021 | Shveidel | G06F 11/0751 |
| 2022/0224416 A1* | 7/2022 | Buma | H04B 10/516 |
| 2023/0080354 A1* | 3/2023 | Murakami | G02F 1/212 |
| | | | 398/198 |
| 2024/0340087 A1* | 10/2024 | Wen | H04B 10/50575 |

OTHER PUBLICATIONS

International Search Report & Written Opinion for PCT/US2024/031407 mailed Sep. 18, 2024., 13 pp.

Sotoodeh, Mohammad, et al., "Modulator Bias and Optical Power Control of Optical Complex E-Field Modulators", Journal of Lightwave Technology, vol. 29, No. 15, Aug. 1, 2011, 14 pages.

\* cited by examiner

IN-PHASE (I) / QUADRATURE (Q) CORRELATION DITHER FOR MODULATOR QUADRATURE CONTROL

FIELD OF THE DISCLOSURE

The subject disclosure relates to controlled correlation between (e.g., digital) in-phase (I) and quadrature-phase (Q) signals for detecting and addressing I/Q mis-orthogonality.

BACKGROUND

Electro-optical modulators (EOMs) are optical devices that apply high frequency electrical signals to modulate a light source, such as a laser beam. These modulators have critical characteristics that can drift with wavelength, age, and temperature.

BRIEF DESCRIPTION OF THE DRAWINGS

Reference will now be made to the accompanying drawings, which are not necessarily drawn to scale, and wherein.

DETAILED DESCRIPTION

The subject disclosure describes illustrative embodiments of an I/Q correlation method that provides accurate control of modulator biases, and particularly better control than those provided by conventional methods, with small (e.g., minimal to no) performance penalties. As described in more detail below, a correlation dither may be introduced between digital I and Q signals, which provides a cross-talk term that can be leveraged to control the bias of an outer Mach-Zehnder (MZ) modulator of a nested MZ modulator architecture. Various embodiments of the I/Q correlation method are described herein.

Figure 1:
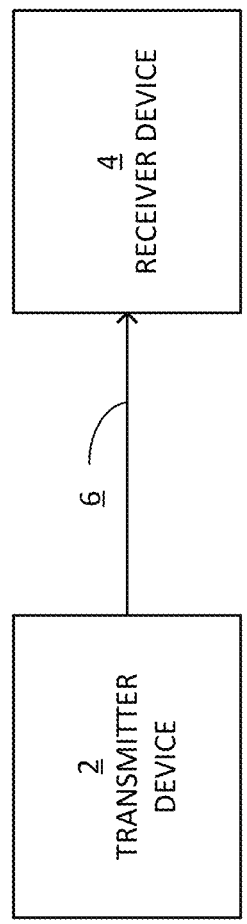
FIG. 1 is a diagram of a non-limiting example of a communication network in accordance with various aspects described herein.

FIG. 1 is a diagram of a non-limiting example of a communication network 1 in accordance with various aspects described herein. The communication network 1 may include at least one transmitter device 2 and at least one receiver device 4. The transmitter device 2 may be capable of transmitting signals over a communication channel, such as a communication channel 6. The receiver device 4 may be capable of receiving signals over a communication channel, such as the communication channel 6. In various embodiments, the transmitter device 2 may also be capable of receiving signals and/or the receiver device 4 may also be capable of transmitting signals. Thus, one or both of the transmitter device 2 and the receiver device 4 may be capable of acting as a transceiver. In one or more embodiments, the transmitter device 2 and/or the receiver device 4 may be a modem.

The communication network 1 may include additional elements not shown in FIG. 1. For example, the communication network 1 may include one or more additional transmitter devices, one or more additional receiver devices, and one or more other devices or elements involved in the communication of signals in the communication network 1.

In some embodiments, the signals that are transmitted and received in the communication network 1 may include optical signals and/or electrical signals. For example, the transmitter device 2 may be a first optical transceiver, the receiver device 4 may be a second optical transceiver, and the communication channel 6 may be an optical communication channel. In certain embodiments, one or both of the first optical transceiver and the second optical transceiver may be a coherent modem.

In various embodiments, each optical communication channel in the communication network 1 may include one or more links, where each link may include one or more spans, and where each span may include a length of optical fiber and one or more optical amplifiers. Where the communication network 1 involves the transmission of optical signals, the communication network 1 may include additional optical elements not shown in FIG. 1, such as wavelength selective switches, optical multiplexers, optical de-multiplexers, optical filters, and/or the like.

Figure 2:
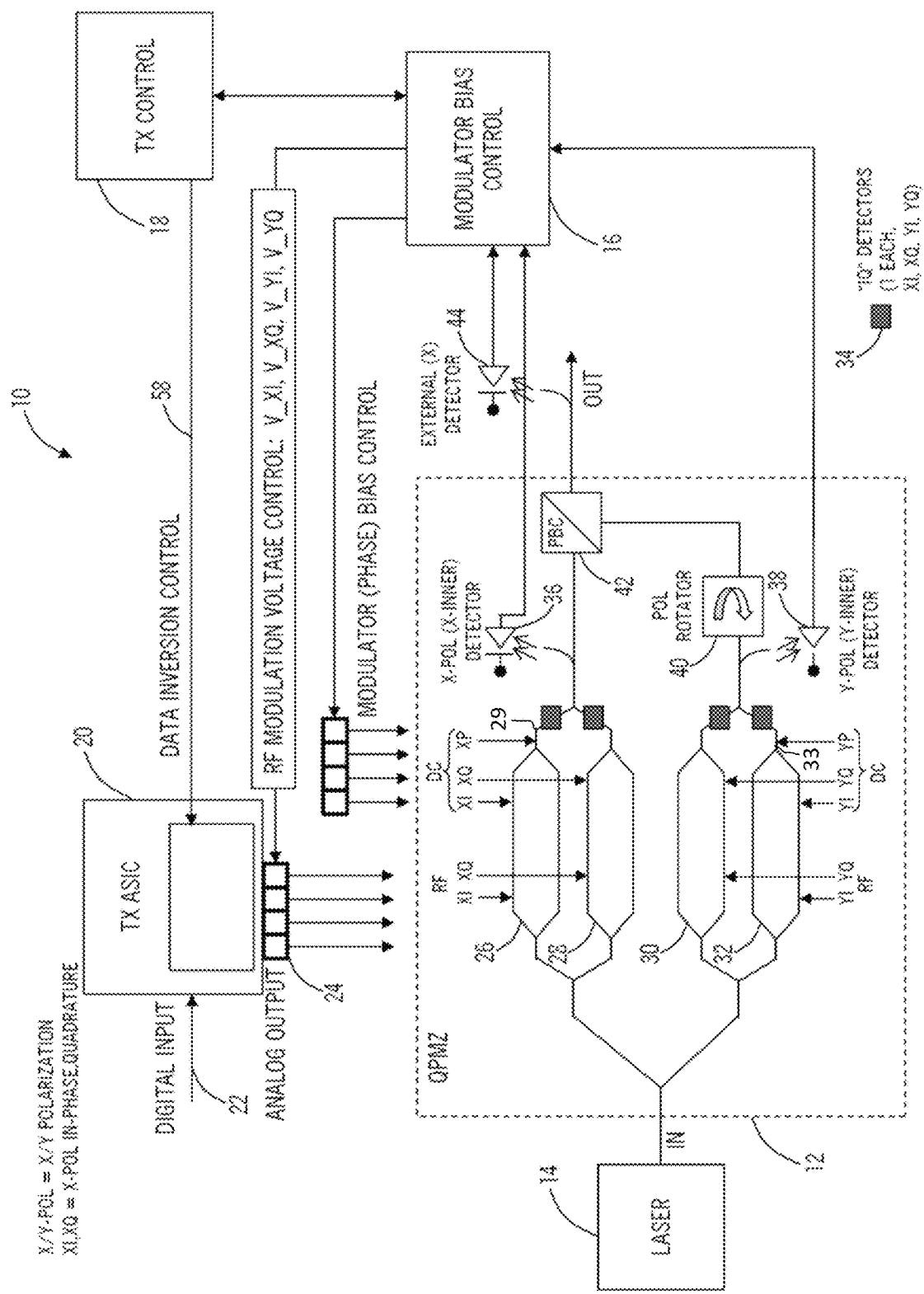
FIG. 2 is a block diagram of an example, non-limiting optical modulator system in accordance with various aspects described herein.

FIG. 2 is a block diagram of an example, non-limiting optical modulator system 10 in accordance with various aspects described herein. In exemplary embodiments, the optical modulator system 10 may correspond to, or may be included or incorporated in, a coherent optical transmitter, such as the transmitter device 2. As shown in FIG. 2, the optical modulator system 10 may include a combination of optical and electrical components, such as, for example, a modulator 12, a laser 14, a modulator bias controller 16, a transmitter (Tx) controller 18, and a Tx application specific integrated circuit (ASIC) 20. The modulator 12 may employ nested Mach-Zehnder (MZ) architecture(s)—i.e., two dual-parallel MZs (DPMZs), each with two inner MZs and one outer MZ—resulting in a quad parallel MZ (QPMZ) modulator.

In one or more embodiments, the optical modulator system 10 may be equipped to control four quadrature data signals (i.e., radio frequency (RF) XI, RF XQ, RF YI, RF YQ signals, where X, Y denote polarization and I, Q denote in-phase and quadrature, respectively) via the Tx ASIC 20. The modulator 12 may include an XI modulator 26, an XQ modulator 28, and an outer phase modulator 29 (respectively functioning as two inner MZs nested within an outer MZ for the X polarization) as well as a YI modulator 30, a YQ modulator 32, and an outer phase modulator 33 (respectively functioning as two inner MZs nested within an outer MZ for the Y polarization). Each MZ may have one or two DC electrodes depending on the implementation of the MZ. The laser 14 may provide a laser output for modulation by the modulator 12. The laser output may be divided (e.g., via a beam splitter) into X and Y polarizations, where the X polarization may be further divided (e.g., via another beam splitter) into an optical I input that is fed into an X-pol I-arm (i.e., the XI modulator 26) and an optical Q input that is fed into an X-pol Q-arm (i.e., the XQ modulator 28), and where the Y polarization may be further divided (e.g., via yet another beam splitter) into an optical I input that is fed into a Y-pol I-arm (i.e., the YI modulator 30) and an optical Q input that is fed into a Y-pol Q-arm (i.e., the YQ modulator 32). The modulator 12 may be capable of independently generating orthogonal optical electric field components (I channel and Q channel) for each polarization X and Y, according to various types of multi-value modulation methods, such as N-quadrature amplitude modulation (QAM), differential quadrature phase shift keying (D-QPSK), etc.

In general operation, the Tx ASIC 20 may receive a digital information stream at a digital input 22 and convert the digital information stream (based on an associated modulation scheme) for driving the modulator 12 via analog outputs 24 (RF XI, RF XQ, RF YI, RF YQ). The analog outputs 24 may be communicatively coupled to the modulator 12. In some embodiments, the Tx ASIC 20 may include a digital filter that provides a transfer function H on the received digital input 22. A digital-to-analog (D/A) converter may be connected to an output of the digital filter, and an analog amplifier may be connected to an output of the D/A converter to provide a gain G. An output of the analog amplifier may provide the analog output 24 to the modulator 12. In certain embodiments, a controller may be connected to the digital filter and the analog amplifier to control the transfer function H and/or the gain G responsive to a data inversion control signal 58 from the Tx controller 18.

A detector 34 (also referred to as a tap-detector) may be included at an output of each of the modulators 26, 28, 30, 32. In certain embodiments, some or all of the modulators 26, 28, 30, 32 may be referred to as inner modulators and can be amplitude, phase, or mixed phase/amplitude modulators. In one or more embodiments, some or all of the modulators 26, 28, 30, 32 may be phase modulators. As shown, the modulator 12 may include an X-polarization detector 36 that is coupled to a combined output of the modulators 26, 28 (or the output of the outer MZ 29), and a Y-polarization detector 38 that is coupled to a combined output of the modulators 30, 32 (or the output of the outer MZ 33). A polarization rotator 40 may be connected to the combined output of the modulators 30, 32. A polarization beam combiner 42 may be connected to the combined output of the modulators 26, 28 and the combined output of the modulators 30, 32. An output of the polarization beam combiner 42 may provide a modulated output of the modulator 12, and an external detector 44 may be tapped off of the output. The various detectors 34, 36, 38, 44 may be communicatively coupled to the modulator bias controller 16.

As shown in FIG. 2, several modulator bias points of the modulator 12 may be controlled or optimized via the modulator bias controller 16. In some embodiments, the Tx controller 18 may control the Tx ASIC 20 and/or the modulator bias controller 16. In various embodiments, the Tx controller 18 may control the modulator bias controller 16 in the following ways: (i) open loop control where bias control loops can be opened, enabling direct control of biases and measurement of the detectors 34, 36, 38, 44; and/or (ii) closed loop control where the feedback polarity of the modulator bias controller 16 can be set, but where the modulator bias controller 16 itself implements the feedback control. The Tx controller 18 may identify (e.g., optimum) bias points whereas the modulator bias controller 16 may maintain those points in service. In some embodiments, the modulator bias controller 16 may control the generated analog output signals of the Tx ASIC 20, rather than control bias values of the modulator 12.

Those skilled in the art will readily appreciate that one of the most important functions of optical transmitter control is the biasing of the modulator in which correct bias (or optical phase) points are selected so that a distortion-free and accurate optical data constellation is used/transmitted. Bias control points are used to allow for low frequency adaptation of critical characteristics. A commonly used material system for MZ modulators is Lithium Niobate (LiNbO$_3$), owing to its linear Pockels effect and its technological maturity. LiNbO$_3$ modulators generally have a large (optical) phase adjustment range and, therefore, flexible modulator bias points. A generalized search can be implemented to find "reasonable" bias points. Generally, the control of bias points does not simply involve the driving of a metric to zero, but rather involves an optimization on some locally convex surface of metrics.

Figure 3:
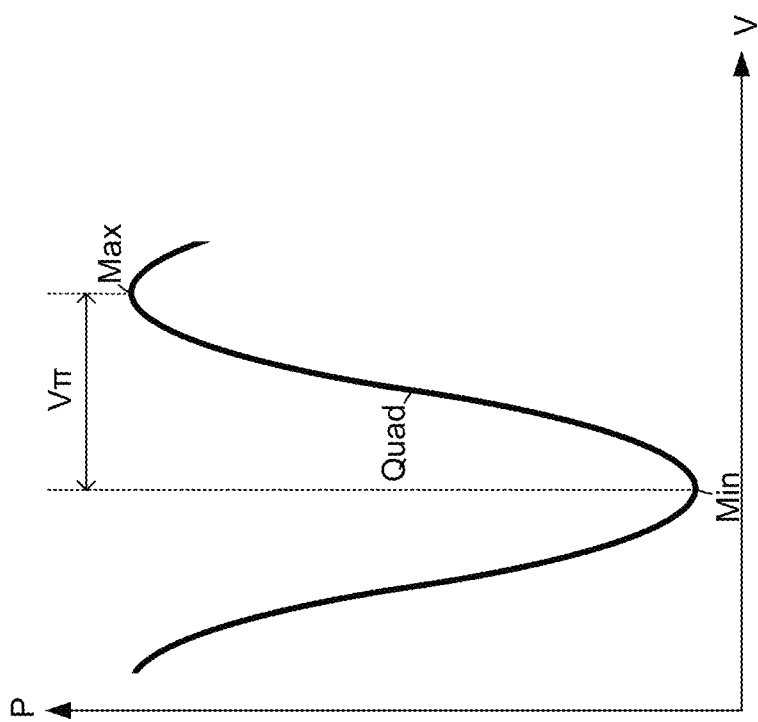
FIG. 3 shows an example Mach-Zehnder (MZ) modulator transfer function in accordance with various aspects described herein.

The following is a brief description of an MZ modulator transfer function and how each of the inner MZs and the outer MZ in a nested MZ configuration may be biased to suit the desired type of modulation scheme. FIG. 3 shows an example MZ modulator transfer function in accordance with various aspects described herein. As shown, the transfer function represents the relationship between the bias voltage of the modulator and the optical power of the output optical signal. The minimum point of the curve is referred to as the Min (or Null) bias point of the MZ modulator, and the maximum point of the curve is referred to as the Max (or Peak) bias point of the MZ modulator. Operating the MZ modulator at its Min bias point (and assuming no additional RF signal being applied on top of that) results in full destructive interference of light beams when they exit the two arms of the MZ modulator and recombine at the MZ modulator output (i.e., no light transmittance). Conversely, operating the MZ modulator at its Max bias point (and assuming no additional RF signal being applied on top of that) results in full constructive interference of light beams when they exit the two arms of the MZ modulator and recombine at the MZ modulator output (i.e., full light transmittance). The linear point of the curve, between the Min and Max bias points, is referred to as the quadrature (or Quad) bias point. Operating the MZ modulator at its Quad bias point provides a π/2 phase shift between light beams in the two arms of the MZ modulator. Operating the MZ modulator at the Quad bias point optimizes linearity of the MZ modulator.

Still referring to FIG. 3, $V_\pi$ is the difference between the Min bias point and the Max bias point. In other words, $V_\pi$ is the voltage difference required to achieve a π phase shift between the two arms. The efficiency of a modulator can be characterized by its V. A modulator with a smaller $V_\pi$ is more efficient since it can provide the same optical output power swing at a lower voltage difference. For various modulation schemes, such as D-QPSK and QAM, the inner MZs are biased (i.e., in FIG. 2, via DC XI and DC XQ for the X polarization and DC YI and DC YQ for the Y polarization) at their Min bias points, and the outer MZ is biased (i.e., in FIG. 2, via DC XP for the X polarization and DC YP for the Y polarization) at its Quad bias point. This biasing scheme ensures that the outer MZ provides a pure quadrature phase shift, where power outputs from the inner MZs are simply added or combined at the output of the outer MZ, with no interference or distortion between the two inner MZ outputs.

The operating bias of LiNbO$_3$ modulators can drift due to aging or varying temperature. Thus, an active control loop is required to keep the three DPMZ biases at their optimal points. Optical modulator designers have developed a variety of techniques to address this challenge. For example, Gary Mak et al. U.S. Pat. No. 9,294,200, entitled "OPTIMUM MODULATOR BIAS SYSTEMS AND METHODS IN COHERENT OPTICAL TRANSMITTERS" (and which is incorporated herein by reference in its entirety), describes employing two controllers for modulator bias control purposes. Gary Mak et al. U.S. Pat. No. 9,059,805, entitled "OPTIMUM MODULATOR BIAS SYSTEMS AND METHODS IN COHERENT OPTICAL TRANSMITTERS" (and which is incorporated herein by reference in its entirety), describes techniques for sweeping the bias points. Kim Roberts et al. U.S. Pat. No. 8,249,467, entitled "SELF TEST OF A DUAL POLARIZATION TRANSMITTER" (and which is incorporated herein by reference in its entirety), describes a method of self-calibration prior to going into service. Other systems implement modulator bias control by using information that is fed back to the transmitter-see, for instance, Qunbi Zhuge et al. U.S. Pat. No. 10,608,746, entitled "MITIGATION OF ELECTRICAL-TO-OPTICAL CONVERSION IMPAIRMENTS INDUCED AT TRANSMITTER," and Han Sun et al. U.S. Pat. No. 8,131,148, entitled "OPTICAL TRANSMITTER ERROR REDUCTION USING RECEIVER FEEDBACK," both of which are incorporated herein by reference in their entireties. There exist quadrature control techniques that involve minimization of peak RF power detection. These techniques require the use of extra hardware components, namely a fast RF detector that is followed by a diode (to introduce some non-linearity that is sensitive to peak power changes) and a low-pass filter, where a dither is applied to the outer MZ bias in order to identify the proper bias point for the outer MZ. Use of such a dither can result in errors in I/Q orthogonality.

Kim Roberts et al. U.S. Pat. No. 7,676,161, entitled "MODULATION E-FIELD BASED CONTROL OF A NON-LINEAR TRANSMITTER" (and which is incorporated herein by reference in its entirety), describes digital generation of dithers for modulator bias control. James Harley et al. U.S. Pat. No. 7,266,306, entitled "METHOD FOR OPTICAL CARRIER SUPPRESSION AND QUADRATURE CONTROL" (and which is incorporated herein by reference in its entirety), discusses a beat approach for outer MZ bias control. Beat approaches typically involve the application of two simultaneous dithers to the biases of the two inner MZs (e.g., one dither for DC XI and another dither for DC XQ). When the outer MZ is biased at its Quad bias point, power outputs from the inner MZs are simply added or combined, and no new signal frequencies are generated. That is, if RF XI has a frequency F1 and RF XQ has a frequency F2, no signal at frequency F1+F2 or F1−F2 is generated at quadrature. However, as the Quad bias point of the outer MZ drifts, the fields of RF XI and RF XQ may interfere, resulting in the generation of new signal frequencies F1+F2 or F1−F2. The appearance of such frequencies can be detected to identify drifting of the Quad bias point, which can aid in adjustment and locking of the bias voltage to the Quad bias point. In certain modulator bias control techniques that employ beat products of dithers, such as that described in Mohammad Sotoodeh, "Modulator Bias and Optical Power Control of Optical Complex E-Field Modulators," Journal of Lightwave Technology, Vol. 29, No. 15 (Aug. 1, 2011) (which is incorporated herein by reference in its entirety), the beat method can also be used to find bias locking points for the two inner MZs.

While dither methods generally allow for accurate centering of modulator bias controls, the magnitudes of the dithers need to be relatively large in order to obtain the required accuracy and time response. Large dithers in a modulator unfortunately move the parameter that is being dithered away from its optimum point and thus degrade the signal-to-noise-ratio (SNR) performance of the overall optical transmission system. For instance, a dither to control Quadrature Error (QE) can cause carrier leakage where some of the source laser beam's light escapes the MZ even at total extinction (the Min point) in the transfer function. The presence of the carrier in the form of a narrow bandwidth spike in the spectrum can result in non-linear effects due to the large amount of power in the spike, which can reduce the operating distance of the overall optical communication system or require more operating power. In the aforementioned simultaneous dithering approach, it might be possible to reduce the amplitudes of the two dithers for the biases of the two inner MZs so that there is less of an impact on their optimum bias points. However, this can also negatively impact SNR, which would require longer averaging times and thus make it more difficult to track quick changes in system temperature.

Exemplary embodiments of the I/Q correlation method may be implemented in a Tx ASIC, such as the Tx ASIC 20 of FIG. 2. The I/Q correlation may be performed in the digital domain with respect to digital terms for I and Q (e.g., at any point during or after demultiplexing of a bipolar non-return-to-zero (NRZ) level encoded signal and prior to outputting of RF XI, RF XQ. RF YI, and RF YQ signals to the modulator 12). At a high level, and as described in more detail below, a correlation term/signal may be used to scale down a "copy" of the digital equivalent of RF XI (prior to its conversion to RF XI), where the scaled down signal may be added to the digital equivalent of RF XQ (prior to its conversion to RF XQ). Similarly, a correlation term/signal may be used to scale down a "copy" of the digital equivalent of RF XQ (prior to its conversion to RF XQ), where the scaled down signal may be added to the digital equivalent of RF XI (prior to its conversion to RF XI). The scaling of the specific portion to be added can be chosen to be positive or negative. It is advantageous for the scaling to be a known relatively small value, such as +1%, or a known function of time. This introduction of cross-talk between XI and XQ has no effect at quadrature, but results in interference as the outer MZ bias drifts. Switching or toggling of the "sign" of the introduced interference signal can aid in identifying the direction to adjust the bias voltage for the outer MZ. The cross-talk may be treated by a receiver (e.g., the receiver 4 of FIG. 1) as a simple noise term that has minimal to no impact on the performance of the receiver. More importantly, the reduced QE at the transmitter enabled by use of the I/Q correlation method provides for significantly better receiver performance.

Embodiments of the I/Q correlation method enable reduced amplitude of (inner) MZ bias dithers as compared to the amplitudes required in existing beat approaches, and thus provides for better (i.e., lower) instantaneous carrier leakage and improved overall system performance. For instance, eliminating use of large bias dithers (e.g., +/−0.01*VT) can result in carrier leakage power drop. Of course, the reduction in carrier leakage can also depend on the modulation loss target. Further, no dithering for the bias of the outer MZ is needed as compared to existing RF peak power minimization control approaches or conventional transmit/receive control approaches. This reduces or eliminates the possibility of I/Q mis-orthogonality, which also improves overall system performance.

Figure 4:
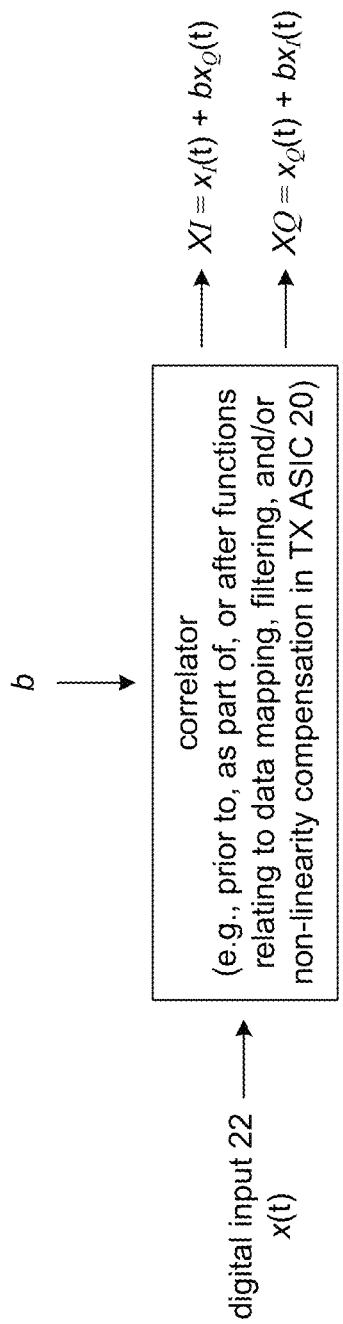
FIG. 4 is a block diagram showing an example implementation of a correlator function in accordance with various aspects described herein.

For the sake of illustration and simplicity of description of the exemplary I/Q correlation method, let us assume an ideal, nested MZ modulator. Here, the discussion is focused on the X polarization, but what follows may be applied for the Y polarization. Assume that, conventionally, values $x_I(\tau)$ and $x_Q(\tau)$ (for the X polarization) would be provided to the modulator's in-phase (I) and quadrature-phase (Q) arms or channels. In exemplary embodiments, I and Q channel signals may be mixed by performing operations that result in $x_I(\tau)+bx_Q(\tau)$ (i.e., as RF XI) and $x_Q(\tau)+bx_I(\tau)$ (i.e., as RF XQ), where these correlated RF signals, XI and XQ, may be respectively fed into the I-axis/arm (26 of FIG. 2) and the Q-axis/arm (28 of FIG. 2). FIG. 4 is a block diagram showing an example implementation of a correlator function in accordance with various aspects described herein. In some embodiments, the correlation term introduced from $x_I(\tau)$ and $x_Q(\tau)$ might be scaled differently. As an example, a correlation term $b_I \cdot x_I(\tau)$ may be introduced from the I-arm into the Q-arm signal, while a correlation term $b_Q \cdot x_Q(\tau)$ may be introduced from the Q-arm into the I-arm signal. Furthermore, the correlation term may be different for different frequency terms such that the I-arm signal $b_I(f) \cdot X_I(f)$ corresponding to frequency f is introduced to the Q-arm signal XQ (f) corresponding to frequency f. Moreover, the correlation term introduced from I-arm $x_I(\tau)$ into the Q-arm signal might be a nonlinear function of $x_I(\tau)$, such as $x_I^3(\tau)$. It is to be understood and appreciated that one or more additional functions/systems may interface with the correlation engine shown in FIG. 4. For instance, in various embodiments, a (e.g., QAM/QPSK) modulation mapper function and/or an optical channel equalizer (such as a chromatic dispersion compensation function) may be implemented prior to (upstream of) the correlator engine. Additionally, or alternatively, an electrical channel equalization function may be implemented subsequent to (downstream of) the correlation engine.

In exemplary embodiments, correlation of I and Q with a value of b that is small enough (e.g., less than a threshold value) allows for accurate control of the outer MZ bias without resulting in significant or undue distortion—e.g., distortion that exceeds a predefined threshold distortion—at the transmitter output. In certain embodiments, the threshold distortion may be determined based on a desired tracking speed with respect to temperature changes. In some embodiments, introduced correlation may result in substantial orthogonality between I and Q—e.g., where any QE between the two output dimensions is less than a threshold error. As an example, the correlation term between the I and Q arms can help to reduce the induced noise due to QE to −40 dB or less below the signal power level.

Continuing the foregoing discussion, the Mach-Zehnder modulator output may be equal to:

$$x_M(t) := \sin(x_I(t) + bx_Q(t)) + e^{j(\frac{\pi}{2}+\alpha)} \cdot \sin(x_Q(t) + bx_I(t)),$$

where a denotes the QE. Under the assumption that the modulator is excited to a root mean square (rms) value that is a small percentage of $V_\pi$, we can approximate the sinusoidal function with a straight line, which approximates the output with the input. Hence, we have:

$$x_M(t) \approx (x_I(t) + bx_Q(t)) + e^{j(\frac{\pi}{2}+\alpha)} \cdot (x_Q(t) + bx_I(t)).$$

Let us assume that power at a photodetector positioned at the output of the modulator's X-Pol arm is calculated as:

$$p(t) = x_M^2(t) \approx$$

-continued
$$(x_I(t) + bx_Q(t))^2 + (x_Q(t) + bx_I(t))^2 + \sin(\alpha) \cdot (x_I(t) + bx_Q(t)) \cdot (x_Q(t) + bx_I(t)).$$

Assuming that b is small enough (e.g., as described above), we can ignore the terms involving $b^2$. Hence, we have:

$$p(t) = x_M^2(t) \approx$$
$$x_I^2(t) + x_Q^2(t) + 4bx_I(t)x_Q(t) + \sin(\alpha) \cdot x_I(t) \cdot x_Q(t) + \sin(\alpha) \cdot b \cdot (x_Q^2(t) + x_I^2(t)).$$

Averaging the signal p ($\tau$) over time (i.e., via low-pass filtering), we have:

$$E\{p(t)\} \approx E\{x_I^2(t)\} + E\{x_Q^2(t)\} + \sin(\alpha) \cdot b \cdot (E\{x_Q^2(t)\} + E\{x_I^2(t)\})$$
$$= (E\{x_Q^2(t)\} + E\{x_I^2(t)\})(1 + \sin(\alpha) \cdot b)$$

Notice that, in the above derivation, we have assumed the incoming signals $x_I(\tau)$ and $x_Q(\tau)$ corresponding to the I-arm and Q-arm are independent and zero-mean (i.e., no bias). Hence, we have E $\{x_I(\tau) \cdot x_Q(\tau)\}$=E $\{x_I(\tau)\} \cdot$ E $\{x_Q(\tau)\}$=0. Assume that we dither the value of b with a square wave between the values of +c and −c, and calculate the average power under each dithered value. In this case, we would have:

$$E\{p_+(t)\} = (E\{x_Q^2(t)\} + E\{x_I^2(t)\})(1 + \sin(\alpha) \cdot c); \text{ and}$$
$$E\{p_-(t)\} = (E\{x_Q^2(t)\} + E\{x_I^2(t)\})(1 - \sin(\alpha) \cdot c).$$

Subtracting the two values results in:

$$\Delta p := E\{p_+(t)\} - E\{p_-(t)\} = 2 \cdot \sin(\alpha) \cdot c \cdot (E\{x_Q^2(t)\} + E\{x_I^2(t)\})$$
$$= 2 \cdot \sin(\alpha) \cdot c \cdot P_X$$

where $P_x$ denotes the modulator output power for the X polarization. From this above equation, we can estimate the QE for the X-pol modulator—i.e. sin (a). Again, we can similarly estimate the QE for the Y-pol modulator by introducing an I/Q correlation (e.g., the same, a similar, or a different one) between the Y-pol's I/Q signals.

As an example, let us choose the value of c to be about 0.01. Under such condition, the ratio of distortion power due to introduced correlation/cross-talk term from the Q-arm on the I-arm versus the signal power can be calculated as:

$$\text{Distortion-to-Signal-Ratio} = DSR = \frac{E\{c^2 x_Q^2(t)\}}{E\{x_I^2(t)\}} = c^2 = 10^{-4} = -40 \text{ dB}.$$

Similarly, the distortion due to correlation/cross-talk term from the I-arm on the Q-arm would be at −40 dB level. The standard deviation of estimated QE does not depend on the power of input signal $P_x$. There are two noise sources on the estimated QE—i.e., the modulator signal power variations and the photodetector thermal noise. However, from the perspective of modulator noise, averaging may be required for a long enough period of time in order to minimize the variations on the estimated QE, which is proportional to the variation in the signal power—i.e., $x_I^2(\tau)+x_Q^2(\tau)$. For instance, let us assume that a white spectrum signal with electrical bandwidth of 100 gigahertz (GHz) is fed to the MZ. The QE estimator may calculate QE as follows:

$$\sin(\alpha) \approx \frac{\Delta p}{2 \cdot c \cdot P_X} = \frac{p_+ - p_-}{2 \cdot c \cdot P_X}.$$

The standard deviation of the estimated $p_+$ and $p_-$ scales as $$std(p_+) = std(p_-) \approx P_X \cdot \sqrt{\frac{B_W}{100 \text{ GHz}}},$$

where $B_w$ denotes the electrical bandwidth of the photodetector's low-pass filter for estimation of $p_+$ and $p_-$. Since the noise levels on $p_+$ and $p_-$ are independent, the standard deviation of $\Delta p$ will scale as:

$$std(\Delta p) = \sqrt{2} \cdot std(p_+) = P_X \cdot \sqrt{\frac{2 \cdot B_W}{100 \text{ GHz}}}.$$

Assuming that $B_w \approx 10$ Hz (corresponding to 100 millisecond (ms) averaging time for estimation of $p_+$ and $p_-$), we have:

$$std(\Delta p) \approx P_X \cdot \sqrt{\frac{2 \cdot B_W}{100 \text{ GHz}}} = \frac{\sqrt{2} P_X}{10^5}.$$

This means that the standard deviation of the QE estimate would be equal to:

$$std(\sin(\alpha)) = \frac{std(\Delta p)}{2 \cdot c \cdot P_X} = \frac{1}{\sqrt{2} \cdot 10^5 \cdot c} = \frac{1}{\sqrt{2} \cdot 10^5 \cdot 0.01} = 7 \cdot 10^{-4} \approx -63 \text{ dB}.$$

If desired, the value of c may be further restricted in order to further reduce the distortion power due to induced crosstalk/correlation term between I and Q arms to below-40 dB level. For instance, let's say c=0.01 and $B_w$=100 Hz. Here, we would still obtain a satisfactory level of standard deviation of QE as std (sin (a))=7·10$^{-3.5}$=−53 dB. The sign of error—i.e., the sign of $\Delta p$: =E {$p_+(\tau)$}−E {$p_-(\tau)$}—indicates the direction to move the bias of the outer MZ. In general, it may be better (or preferred) to move the outer MZ bias proportionally to the value of $\Delta p$, rather than just sign ($\Delta p$). This includes the information of the magnitude of error in the movement of the outer MZ bias. In other words, the MZ movement may be u. $\Delta p$, where u is a gain factor for the bias control feedback loop.

In various embodiments, the I/Q correlation method may be used in conjunction with certain existing bias locking approaches. For instance, in some embodiments, techniques that involving dithering of each of the DC biases of the two inner MZs—i.e., where the two dithers are applied in sequence, such as by first applying a dither for the I-channel inner MZ during a first time window and then applying a second dither for the Q-channel inner MZ during a second time window, and where the 1$^{st}$ harmonics of these dithers are nulled—may be employed in the optical modulator system 10 so as to lock the two inner MZs to their respective Min bias points. In certain embodiments, the above-described simultaneous dithering technique (i.e., the beat approach) may additionally be applied (e.g., during a third time window) to help lock the outer MZ to its Quad bias point. However, this latter approach may be employed (e.g., only) during start-up (e.g., power on or initialization) of the optical modulator system 10 when there are not yet any digital input data and/or corresponding RF input signals available for the modulator 12. When digital input data and/or corresponding RF input signals are available for the modulator 12, the simultaneous dithering technique may be deactivated, and the I/Q correlation method may be employed for locking the outer MZ to its Quad bias point. Doing so can restrict the large beat terms that are associated with the simultaneous dithering technique from negatively impacting carrier suppression.

In exemplary embodiments, the modulator bias controller 16 and/or the Tx controller 18 of FIG. 2 may be configured or adapted to facilitate the I/Q correlation method. For the aforementioned simultaneous dithering technique, the modulator bias controller 16 may include a bandpass filter and/or phase-sensitive locking function that are tuned to detect signals at frequency F1-F2 (or F2-F1), where the sign of the detected signal(s) can be used by the modulator bias controller 16 to determine the appropriate direction to adjust the bias voltage of the outer MZ. Because the I/Q correlation method may introduce a cross-talk dither term that has a much higher frequency than dithers used in the simultaneous dithering technique, the modulator bias controller 16 may additionally, or alternatively, include a bandpass filter and/or phase-sensitive locking function that are tuned to detect signals at this higher frequency. Such band-pass filters are helpful in isolating and decoupling the impact of different dithers which may be applied (e.g., simultaneously) to the signal.

It is to be understood and appreciated that different variations of the I/Q correlation method are possible. In some embodiments, other methods for introducing a correlation between I and Q may be used. As an example, known symbols may be introduced into the symbol stream for receiver functions, such as framing and carrier recovery. In one or more embodiments, the pattern of introduced known symbols may be chosen to obtain a desired pattern of correlation between I and Q.

In certain embodiments, a correlation may alternatively be introduced between XI and YI signals to control an adjustable polarization combiner. In other embodiments, a correlation may be introduced between other (e.g., substantially) orthogonal signals out of the modulator.

Further, the I/Q correlation method described above introduces the correlation digitally before the DACs. While this is preferred (since, for instance, the sign of the correlation value can be easily changed in the digital domain), the correlation may instead be introduced in the RF domain. For example, in alternative embodiments, high-speed analog methods may be used to introduce the correlation, such as between DACs, drivers, or modulator arms.

Furthermore, in some embodiments, the I/Q correlation method may sequentially dither the X-pol and the Y-pol, rather than simultaneously dithering the two polarizations together. This can, for instance, save 3 dB on the overall distortion due to dithering (as in each time, distortion is expected from only "1" polarization), although the dithering time will be increased by a factor of 2x due to sequential averaging on the X and Y polarizations. Assuming that the distortion level is relaxed to −37 dB and dithers on the X and Y polarizations are run sequentially, the value of c can be increased to about ~0.014.

Also, a different approach for the I/Q correlation method with reduced complexity may be taken. For instance, the data "cross-talk" may be utilized or kept "on" all of the time, where flipping of the sign of the cross-talk between +c and −c may be performed in order to estimate the value of Δp described above. With this approach, no new dither would be needed. Rather, the sign of the response will indicate which way to adjust the outer MZ bias. The dither for the outer MZ bias can then be small (e.g., on the order of 1% of pi).

In some alternative embodiments, a constant value for c may be used (with no sign change) in conjunction with an outer MZ bias dither. In these embodiments, the cross-talk (correlation) term c may generate interference, which can be detected to determine the dithering that needs to be added to the outer MZ's bias.

In various embodiments, pseudo-random dither patterns may be used instead of a square wave, which can avoid the creation of power tones that might confuse other control systems in the optical line.

It is to be understood and appreciated that various schemes can be built on the I/Q correlation method, in general, using additive or multiplicative dithers on signals, gains, and/or bias voltages.

In some embodiments, a frequency-dependent digital correlation/cross-talk term between I and Q arms may be introduced in order to determine any frequency-dependent cross-talk term between I and Q arms' RF signals. Under such circumstances, a term $b(f) \cdot XQ(f)$ corresponding to content of the Q-arm at frequency f may be introduced to $X_I(f)$ corresponding to content of the I-arm at frequency f. As an example, by introducing $b(f)=c$ for $f_0 \leq f \leq f_1$ and $b(f)=0$ for all other frequencies f, we can identify any frequency-dependent non-orthogonality or RF cross-talk between I and Q arms' RF signals for frequency interval $[f_1, f_2]$.

In one or more embodiments, the I/Q correlation method may be employed to measure I/Q nonquadrature (or misorthogonality), which can be used to control the phase of the outer MZ in the digital domain. In these embodiments, for instance, digital signal processing (DSP) techniques may be employed to "close the loop" by digitally pre-compensating an equal and opposite amount in a Transpose filter (although this might not be as accurate since it does not involve driving of the metric to zero and thus is sensitive to an error in the gain of the metric). Here, the modulator bias controller 16 may provide data regarding detected output power of the X-pol arm and the Y-pol arm of the modulator 12 to the Tx ASIC 20, which can utilize this data to affect the digital pre-compensation.

Figure 4A:
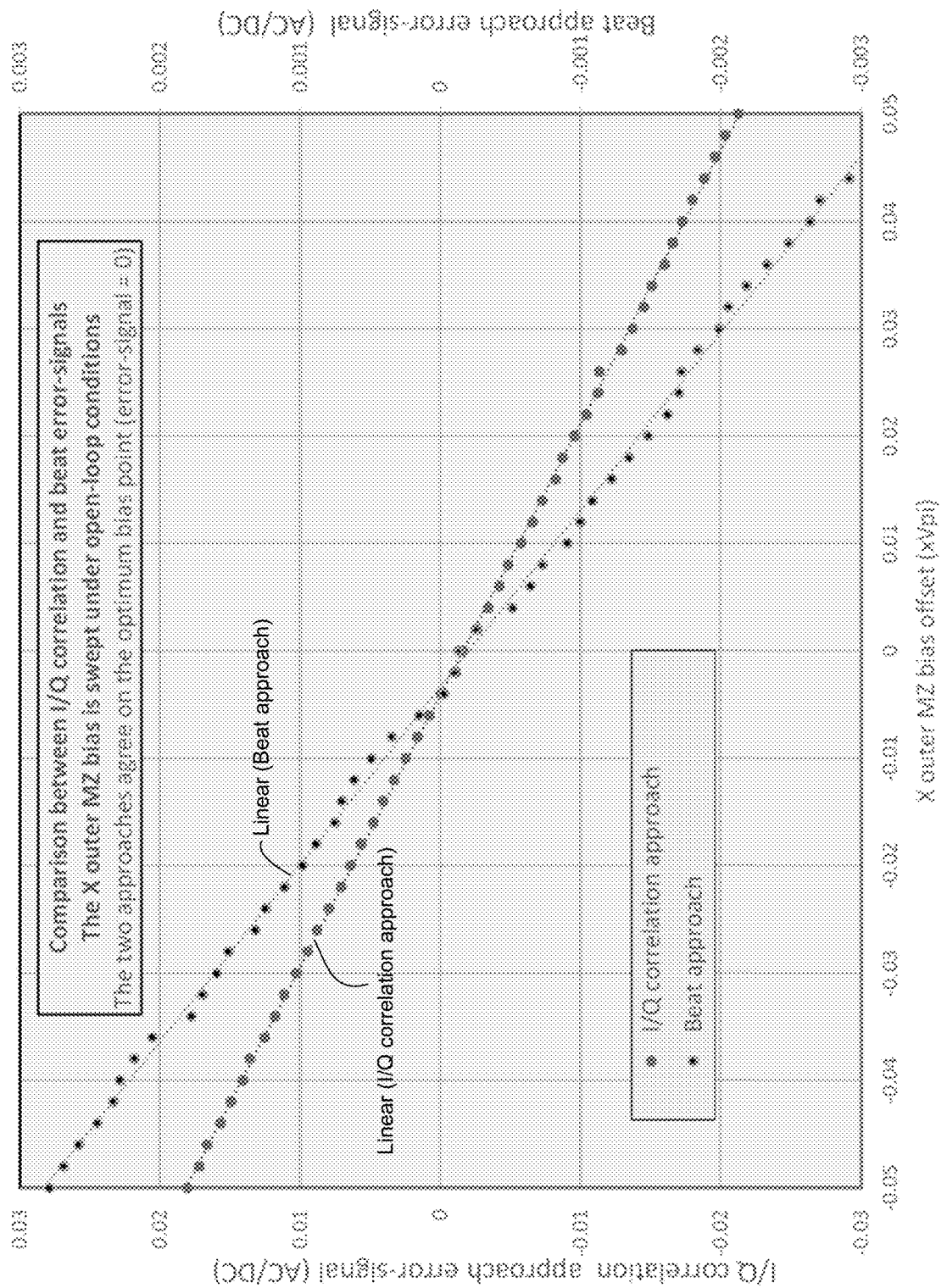
FIG. 4A illustrates an example measurement obtained during a proof-of-concept experiment in accordance with various aspects described herein.

It is to be understood and appreciated that, although one or more of FIGS. 2-4 might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various components have been illustrated in FIGS. 2, 3, and/or 4 as separate components, it will be appreciated that multiple components can be implemented as a single component, or a single component can be implemented as multiple components. Additionally, functions described as being performed by one component or system may be performed by multiple components or systems, or functions described as being performed by multiple components or systems may be performed by a single component or system. Moreover, FIG. 4A illustrates an example measurement obtained during a proof-of-concept experiment in accordance with various aspects described herein. As shown, the I/Q correlation method described herein and the conventional approach of using beat error-signals are generally in agreement in terms of identifying an optimum bias point. This demonstrates the efficacy of embodiments of the I/Q correlation method described herein. Of course, as discussed above, the I/Q correlation method advantageously provides for better (i.e., lower) instantaneous carrier leakage and improved overall system performance as compared to the conventional beat approach.

Figure 5:
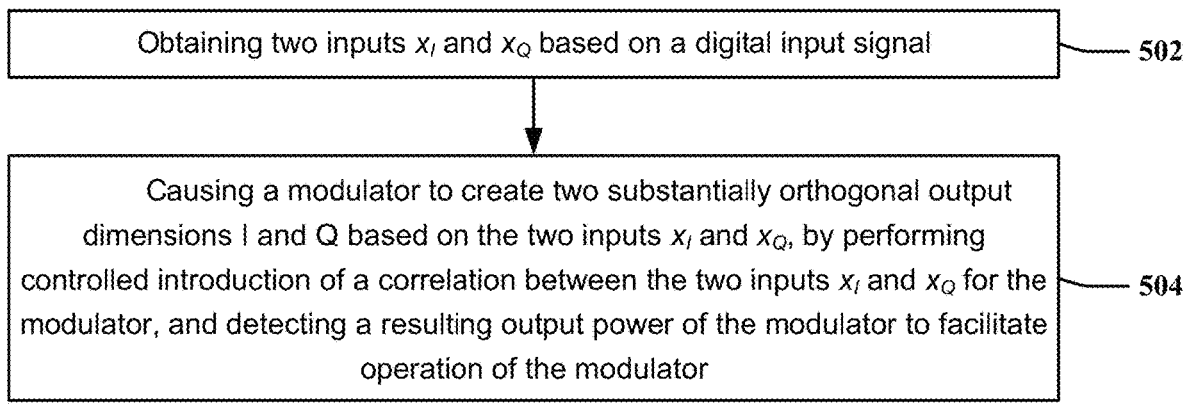
FIG. 5 depicts an illustrative embodiment of a method in accordance with various aspects described herein.

FIG. 5 depicts an illustrative embodiment of a method 500 in accordance with various aspects described herein. For example, the method may be performed by the Tx ASIC 20, the modulator bias controller 16, and/or the Tx controller 18.

At 502, the method can include obtaining two inputs $x_I$ and $x_Q$ based on a digital input signal. For example the Tx ASIC 20, the modulator bias controller 16, and/or the Tx controller 18 may individually or cooperatively perform one or more operations that include obtaining two inputs $x_I$ and $x_Q$ based on a digital input signal 22.

At 504, the method can include causing a modulator to create two substantially orthogonal output dimensions, in-phase (I) and quadrature (Q), based on the two inputs $x_I$ and $x_Q$, by performing controlled introduction of a correlation between the two inputs $x_I$ and $x_Q$ for the modulator, and detecting a resulting output power of the modulator to facilitate operation of the modulator. More specifically, the magnitude of correlation may be controlled in order to maintain a negligible distortion in the system due to induced distortion. Furthermore, the sign of correlation may be controlled so that the controller can detect the sign (or magnitude) of QE. For example, the Tx ASIC 20, the modulator bias controller 16, and/or the Tx controller 18 may individually or cooperatively perform one or more operations that include causing a modulator 12 to create two substantially orthogonal output dimensions I and Q based on the two inputs $x_I$ and $x_Q$, by performing controlled introduction of a correlation (e.g., b or b dithered with c) between the two inputs $x_I$ and $x_Q$ for the modulator 12, and detecting a resulting output power of the modulator 12 to facilitate operation of the modulator 12.

While for purposes of simplicity of explanation, the respective processes are shown and described as a series of blocks in FIG. 5, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more aspects of the subject disclosure include a device, comprising a modulator configured to output optical signals, and a control system configured to cause the modulator to create two substantially orthogonal output dimensions I and Q based on two inputs $x_I$ and $x_Q$ derived from a digital input signal, by performing controlled introduction of a correlation between the two inputs $x_I$ and $x_Q$ for the modulator, and detecting a resulting output power of the modulator to facilitate operation of the modulator.

One or more aspects of the subject disclosure include a method comprising obtaining, by a processing system including a processor, two inputs $x_I$ and $x_Q$ based on a digital input signal, and causing, by the processing system, a modulator to create two substantially orthogonal output dimensions I and Q based on the two inputs $x_I$ and $x_Q$, by performing controlled introduction of a correlation between the two inputs $x_I$ and $x_Q$ for the modulator, and detecting a resulting output power of the modulator to facilitate operation of the modulator.

One or more aspects of the subject disclosure include a non-transitory machine-readable medium, comprising executable instructions that, when executed by a processing system including a processor, facilitate performance of operations, the operations comprising obtaining two inputs $x_I$ and $x_Q$ based on a digital input signal, and causing a modulator to create two substantially orthogonal output dimensions I and Q based on the two inputs $x_I$ and $x_Q$, by performing controlled introduction of a correlation between the two inputs $x_I$ and $x_Q$ for the modulator, and detecting a resulting output power of the modulator to facilitate operation of the modulator.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or non-volatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments. Additionally, functions described as being performed by one component or system may be performed by multiple components or systems, or functions described as being performed by multiple components or systems may be performed by a single component or system, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a modulator configured to output an optical signal; and
a control system configured to cause the modulator to create two orthogonal output dimensions, in-phase (I) and quadrature (Q), based on two inputs $x_I$ and $x_Q$ derived from a digital input signal, by:
performing controlled introduction of a correlation between the two inputs $x_I$ and $x_Q$ for the modulator, wherein the controlled introduction corresponds to use of a controlled correlated term from the input $x_I$ to the input $x_Q$, or from the input $x_Q$ to the input $x_I$, that is filtered out via a digital filter, and wherein the controlled correlated term enables detection of any frequency-dependent non-orthogonality within dimension I radio frequency (RF) drive signals and within dimension Q RF drive signals or within I and Q arms of the modulator; and
detecting a resulting output power of the modulator to facilitate operation of the modulator.

2. The device of claim 1, wherein the modulator comprises an electro-optical modulator, and wherein the two inputs $x_I$ and $x_Q$ comprise electrical signals.

3. The device of claim 1, wherein the modulator comprises a nested Mach-Zehnder modulator.

4. The device of claim 1, wherein the two inputs xi and $x_Q$ are produced by digital-to-analog converters (DACs), and wherein the controlled introduction occurs in a digital domain.

5. The device of claim 1, wherein the controlled introduction corresponds to addition of a specific scaled portion of the input $x_I$ to the input $x_Q$ or addition of a specific scaled portion of the input $x_Q$ to the input $x_I$.

6. The device of claim 1, wherein the control system is further configured to cause the modulator to create two orthogonal output dimensions YI and YQ for a Y polarization based on two inputs $y_I$ and $y_Q$ by performing a second controlled introduction of a second correlation between the two inputs $y_I$ and $y_Q$.

7. The device of claim 1, wherein the controlled introduction comprises an insertion of known symbols into a symbol stream.

8. The device of claim 1, wherein the detecting the resulting output power comprises detecting a variation of output power.

9. The device of claim 8, wherein the correlation comprises a square-wave dither pattern; and the detecting the variation of output power comprises a correlation of the output power with the square-wave dither pattern, or
wherein the correlation comprises a pseudo-random dither pattern and the detecting the variation of output power comprises a correlation of the output power with the pseudo-random dither pattern.

10. The device of claim 8, wherein a sign of the variation of output power is detected, and wherein a magnitude of the variation of output power is detected.

11. The device of claim 1, wherein the correlation comprises a value that is less than a threshold value, and wherein the two output dimensions are orthogonal such that a quadrature error (QE) between the two output dimensions is less than a threshold error.

12. The device of claim 1, wherein the dimension I represents an in-phase dimension of optical signals created by the modulator and the dimension Q represents a quadrature dimension of optical signals created by the modulator, or
wherein the dimension I represents a dimension within one polarization of optical signals created by the modulator and the Q represents a dimension within an orthogonal polarization.

13. The device of claim 1, wherein the control system is further configured to add a dither to a bias control voltage.

14. The device of claim 1, wherein the detecting is performed using a detection circuit comprising a photodiode, and wherein the detection circuit has a bandwidth that is less than 0.001 of a bandwidth of the input $x_I$.

15. The device of claim 1, wherein the two orthogonal output dimensions I and Q comprise dimensions XI and XQ for an X polarization, wherein the control system is further configured to cause the modulator to create two orthogonal output dimensions YI and YQ for a Y polarization based on two inputs $y_I$ and $y_Q$ by performing a second controlled introduction of a second correlation between the two inputs $y_I$ and $y_Q$, wherein the output dimension YI is also orthogonal to the output dimensions XI and XQ, and wherein the controlled introduction of the correlation between the two inputs $x_I$ and $x_Q$ and the second controlled introduction of the second correlation between the two inputs $y_I$ and $y_Q$ are performed simultaneously.

16. The device of claim 1, further comprising a Transpose filter, wherein the detecting provides a measure of I/Q nonquadrature, and wherein the operation of the modulator is effected by performing digital pre-compensation of an equal and opposite amount in the Transpose filter based on the measure of the I/Q nonquadrature.

17. A device, comprising:
a modulator configured to output an optical signal; and
a control system configured to cause the modulator to create two orthogonal output dimensions, in-phase (I) and quadrature (Q), based on two inputs $x_I$ and $x_Q$ derived from a digital input signal, by:
performing controlled introduction of a correlation between the two inputs $x_I$ and $x_Q$ for the modulator; and
detecting a resulting output power of the modulator to facilitate operation of the modulator, wherein the detecting is performed using a detection circuit comprising a photodiode, and wherein the detection circuit has a bandwidth that is less than 0.001 of a bandwidth of the input $x_I$.

18. A device, comprising:
a modulator configured to output an optical signal; and
a control system configured to cause the modulator to create two orthogonal output dimensions, in-phase (I) and quadrature (Q), based on two inputs $x_I$ and $x_Q$ derived from a digital input signal, by:
performing controlled introduction of a correlation between the two inputs $x_I$ and $x_Q$ for the modulator, wherein the two orthogonal output dimensions I and Q comprise dimensions XI and XQ for an X polarization;
performing a second controlled introduction of a second correlation between two inputs $y_I$ and $y_Q$, thereby creating two orthogonal output dimensions YI and YQ for a Y polarization based on the two inputs $y_I$ and $y_Q$, wherein the output dimension YI is orthogonal to the output dimensions XI and XQ, and wherein the controlled introduction of the correlation between the two inputs $x_I$ and $x_Q$ and the second controlled introduction of the second correlation between the two inputs $y_I$ and $y_Q$ are performed simultaneously; and
detecting a resulting output power of the modulator to facilitate operation of the modulator.

19. A device, comprising:
a modulator configured to output an optical signal;
a control system configured to cause the modulator to create two orthogonal output dimensions, in-phase (I) and quadrature (Q), based on two inputs $x_I$ and $x_Q$ derived from a digital input signal, by:
performing controlled introduction of a correlation between the two inputs x and $x_Q$ for the modulator; and
detecting a resulting output power of the modulator to facilitate operation of the modulator; and
a transpose filter, wherein the detecting provides a measure of I/Q nonquadrature, and wherein the operation of the modulator is effected by performing digital pre-compensation of an equal and opposite amount in the transpose filter based on the measure of the I/Q nonquadrature.

20. The device of claim 19, wherein the modulator comprises a nested Mach-Zehnder modulator.

21. The device of claim 19, wherein the two inputs $x_I$ and $x_Q$ are produced by digital-to-analog converters (DACs), and wherein the controlled introduction occurs in a digital domain.

* * * * *